(No Model.)
G. C. BURCH.
REACH CONNECTION FOR VEHICLES.
No. 371,734. Patented Oct. 18, 1887.
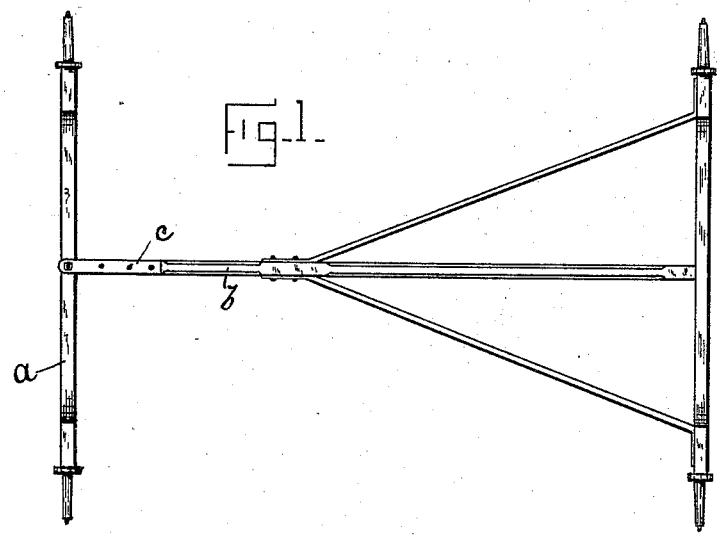
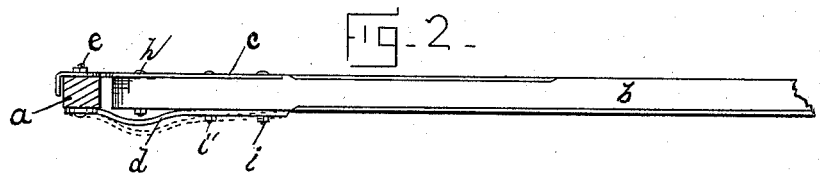
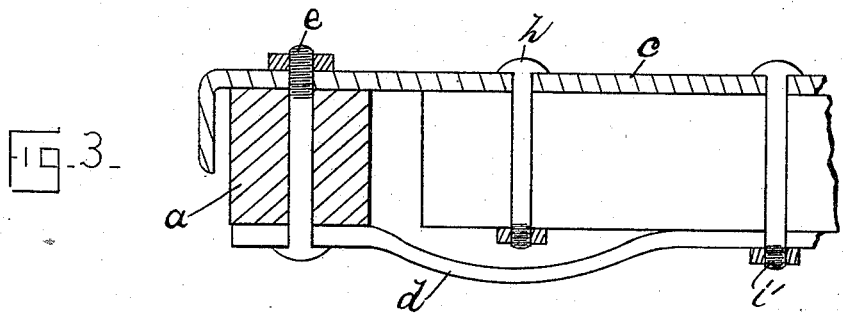
Witnesses
F. L. Allen.
Tyler J. Howard.
Inventor
George C. Burch,
By his Attorney
Frank H. Allen.

UNITED STATES PATENT OFFICE.

GEORGE C. BURCH, OF GROTON, CONNECTICUT, ASSIGNOR OF ONE-HALF TO ROSWELL S. EDGCOMB, OF SAME PLACE.

REACH-CONNECTION FOR VEHICLES.

SPECIFICATION forming part of Letters Patent No. 371,734, dated October 18, 1887.

Application filed February 11, 1887. Serial No. 227,345. (No model.)

*To all whom it may concern:*

Be it known that I, GEORGE C. BURCH, a citizen of the United States, residing at Groton, New London county, Connecticut, have invented a certain new and useful Improvement in Reach-Connections for Vehicle-Gears, which improvement is fully set forth and described in the following specification, reference being had to the accompanying drawings.

This invention relates to the pivotal connection between the front axle and the reach in that class of gears which use depressed or cranked axles, taking the place and performing the office of the so-called "fifth-wheel." In this class of gears, so far as I am familiar with them, the reach has heretofore been provided with a simple metallic fork at its forward end, which straddles the axle and is pivoted to said axle by a bolt passing through said fork and axle. This construction allows said parts to rattle as soon as they begin to wear.

My present invention is intended to overcome and prevent all tendency to rattle, and is so constructed that it retains the operative parts in close engagement until completely worn out.

The annexed drawings illustrate my device, Figure 1 being a top view of the axles, reach, and braces of a gear and Fig. 2, a view of the front end of the reach somewhat enlarged. In Fig. 3 I have shown in section my new form of connection enlarged to nearly full size, and illustrating my preferred form of bolt.

The reference-letter $a$ indicates the front axle of a gear, and $b$ the reach. Secured fixedly to the upper side of the reach, at its free end, is a plate, $c$, which extends outward over the axle $a$ and is perforated to receive a bolt, $e$, hereinafter referred to. On the lower side of reach $b$ is a plate, $d$, forming, with plate $c$, a fork to straddle the axle, and also perforated to receive bolt $e$. This lower plate, $d$, is formed preferably of steel and is secured to the reach a considerable distance back from the end of the reach, thus allowing the perforated free end of said plate to act as a spring to clasp the axle firmly.

The normal shape of said plate $d$ before being bolted to the reach is considerably curved, as indicated in dotted lines in Fig. 2.

When the parts are to be assembled, the upper plate, $c$, is fastened to the reach by bolt $h$. Bolts $i\ i'$ are then passed down through said plate and reach, and the spring-plate $d$ is placed in position under the reach, the axle $a$ being also brought to place between the two arms of the fork. The nut on bolt $i$ is first screwed home and a hand screw or clamp is then used to force the spring-plate up to place against the reach, so that a nut may be screwed onto bolt $i'$. This having been done, the king-bolt $e$ is passed upward through the plates and axle.

The king-bolt $e$ may be a simple bolt, with retaining-nut; but I prefer to secure it as shown in Fig. 3. It will be noted that I have tapped out the hole in plate $c$ and screwed bolt $e$ upward through said hole, and finally have added a check-nut. Such a construction, in connection with my spring-plate $d$, prevents all tendency to work loose.

Having thus described my invention, I claim—

A reach and axle connection consisting of a plate secured rigidly to one side of the reach, a spring-plate secured, as herein described, to the opposite side, and a king-bolt which, passing through said plates and the axle, interlocks said elements, as set forth.

GEORGE C. BURCH.

Witnesses:
FRANK H. ALLEN,
TYLER J. HOWARD.